UNITED STATES PATENT OFFICE.

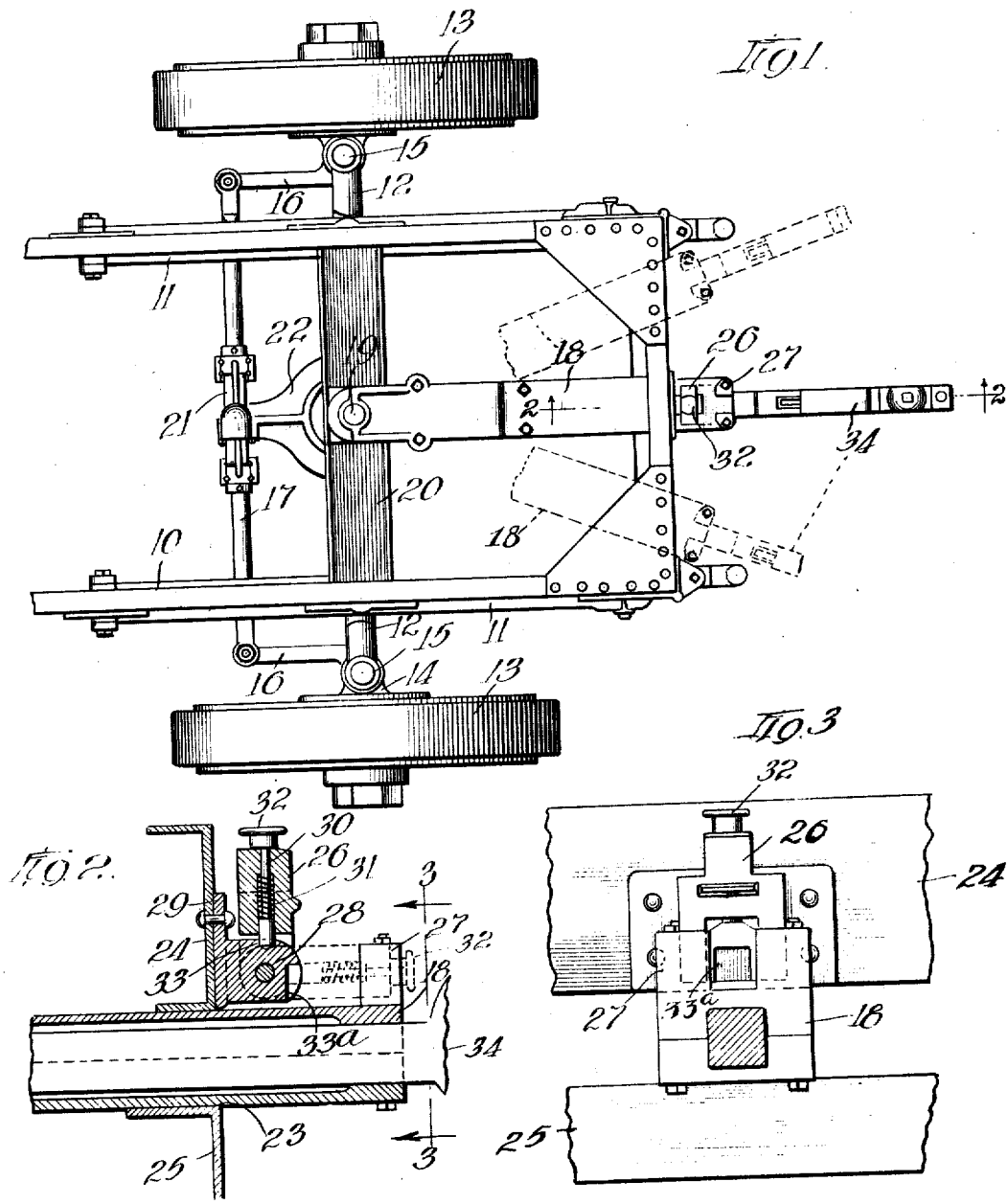

ADDI BENJAMIN CADMAN, OF BELOIT, WISCONSIN, ASSIGNOR, BY MESNE ASSIGNMENTS, TO WARNER MANUFACTURING COMPANY, OF SOUTH BELOIT, ILLINOIS, A CORPORATION OF WISCONSIN.

TRAILER-TRUCK.

1,305,521.  Specification of Letters Patent.  Patented June 3, 1919.

Original application filed December 6, 1916, Serial No. 135,419. Divided and this application filed November 2, 1917. Serial No. 199,819.

*To all whom it may concern:*

Be it known that I, ADDI BENJAMIN CADMAN, a citizen of the United States, residing at Beloit, in the county of Rock and State of Wisconsin, have invented certain new and useful Improvements in Trailer-Trucks, of which the following is a specification.

The invention relates to reversible trailer trucks of the type adapted to be hitched onto a motor vehicle or other drawing unit and coupled together with any desired number of trucks to form a train; and the invention relates more particularly to a locking device for draw-bars.

Trailer trucks of the type set forth are of duplicate construction at their opposite ends, so that each truck is adapted to be drawn or steered from either end. For this reason it becomes necessary, in use, to lock the draw-bar at the end of the truck forming the rear end, against lateral movement; and it is the object of this invention to provide a readily operable locking device of improved construction which is adapted to effectively accomplish its designated function.

The object of the invention thus generally stated, together with other and ancillary advantages, is attained by the construction and arrangement illustrated in the accompanying drawings forming a part hereof, in which Figure 1 is a fragmental top plan view of one end of a trailer truck having a locking device thereon embodying my invention. Fig. 2 is an enlarged fragmental longitudinal section on line 2—2 of Fig. 1. Fig. 3 is a fragmental transverse section on line 3—3 of Fig. 2.

In the drawings I have illustrated a preferred form of truck embodying my invention. Said truck which is described in my copending application Serial No. 135,419, filed December 6, 1916, and of which this application is a division, comprises a rectangular body frame 10 of any common or preferred construction which is supported at each side through the medium of two springs 11 from an axle 12. Wheels 13 are mounted on journals carried by steering knuckles 14 which are pivoted to opposite ends of the axle to swing on vertical axes 15. Each steering knuckle has an arm 16 which extends longitudinally toward the middle of the frame and the two arms are directly connected by a rigid transverse tie member or rod 17, the ends of which are pivoted to the ends of the arms. The draw-bar 18 may be of any common or preferred construction and is pivoted by means of a vertical king pin 19 to a crosspiece 20 forming a rigid part of the frame 10. The end of said draw bar, which is nearest the center of the truck, is suitably connected to the tie rod 17 as by means of vertically and horizontally disposed yoke members 21 and 22 pivotally connected together and to the tie rod and draw-bar respectively. The free end of said draw-bar extends through a horizontally elongated guideway 23 provided between two bars 24 and 25 forming the end of the body frame 10, whereby the draw-bar is snugly held to prevent vertical movement with respect to the body frame but to allow horizontal swinging movement of the bar for steering purposes.

The locking device which I have provided for locking the draw-bar in central position at the end of the truck, comprises a latch or retaining member 26 pivoted to the frame on the longitudinal median line thereof and adapted to be swung into and out of operative engagement with the draw-bar. For this purpose a pair of upstanding lugs 27 are carried by the draw-bar. The member 26 is bifurcated and is pivoted on a horizontal axis to a lug 28 protruding from a plate 29 suitably secured to the bar 24 forming the horizontal guideway 23; and the lugs 27 are formed or secured on the upper surface of the draw-bar beyond the body frame and are spaced apart to form a keeper for the retaining member 26.

The retaining member is arranged to be held in either its operative or locking position or its inoperative position by means of a detent carried thereby. Said detent is in the form of a pin 30 arranged to be actuated by a spring 31 and having a head 32 on one end normally held by the spring in engagement with the free end of the retainer. The other end of said pin is normally held by the spring in engagement with either of two recesses or notches 33 and 33ª located at the upper and rear surfaces respectively of the lug 28. By this construction it will be evident that the retaining member may be readily released from either its inoperative or operative position by grasping the head 32 and withdrawing the pin 30 against the action of its spring.

At the free end of the draw-bar 18 a coupling head 34 of any preferred construction is provided by means of which the draw-bar is coupled to the draft device attached to the drawing vehicle or the vehicle to be drawn.

I claim as my invention:

1. A truck having, in combination, a body frame, a draw-bar pivoted to the body frame and having a pair of lugs thereon, and a device pivoted on the longitudinal median line of the body frame and movable into and out of engagement with said lugs on the draw-bar whereby to hold the draw-bar in central position when desired.

2. A truck having, in combination, a body frame, a pivoted draw-bar having a pair of lugs thereon, a device pivoted on the longitudinal median line of the body frame and movable into and out of engagement with said lugs on the draw-bar whereby to hold the draw-bar in central position when desired, and a spring-pressed detent carried by said device and engaging a part on the body frame to hold the device in position.

3. A truck having, in combination, a pivoted draw-bar, a body frame having a horizontally elongated guideway through which the draw-bar extends, a lug on the end of the frame on the median line thereof, a retainer pivoted on a horizontal axis on said lug, a pair of lugs on the draw-bar in front of the frame, said retainer being arranged to engage with the last mentioned lugs to hold the draw-bar in central position with respect to the body frame, and a spring-pressed detent arranged to engage in recesses in the first mentioned lug to hold the retainer either in its locking or non-locking position.

4. A truck comprising, in combination, a body frame and a pivoted member extending longitudinally on the frame and forming a swingable draw-bar, said frame embodying a transverse member relative to which said pivoted member is swingable, and means for locking the pivoted member in central position with reference to the frame when desired, said means including a pivoted device carried by one of said members and swingable into holding engagement with the other one of said members.

5. A trailer truck having, in combination, a body frame, a draw-bar operatively associated with the frame and a locking device for holding the draw-bar in central position with reference to the frame when desired, said device including a fixed member and a pivoted member swingable into and out of locking engagement with said fixed member and having yielding means for locking said pivoted member in either operative or inoperative position.

6. In combination with a trailer truck having a body frame and a draw-bar operatively associated therewith, a locking device for holding the draw-bar in central position with reference to the frame when desired including a pivoted latch member adapted to operatively engage with the draw-bar, and means for holding the latch out of operative engagement with its keeper.

7. In combination with a trailer truck having a body frame and a draw-bar operatively associated therewith, a locking device for holding the draw-bar in central position with reference to the frame when desired, including a pivoted latch member, and means for locking said latch member against pivotal movement.

In testimony whereof, I have hereunto set my hand.

ADDI BENJAMIN CADMAN.

It is hereby certified that in Letters Patent No. 1,305,521, granted June 3, 1919, upon the application of Addi Benjamin Cadman, of Beloit, Wisconsin, for an improvement in "Trailer-Trucks," an error appears in the printed specification requiring correction as follows: Page 2, line 79, claim 6, for the words "its keeper" read *the drawbar;* and that the said Letters Patent should be read with this correction therein that the same may conform to the record of the case in the Patent Office.

Signed and sealed this 19th day of August, A. D., 1919.

[SEAL.]

J. T. NEWTON,
*Commissioner of Patents.*

Cl. 213—67.